United States Patent [19]

Boucheron et al.

[11] 3,907,761

[45] Sept. 23, 1975

[54] PROCESS FOR THE PREPARATION OF POLYMERS OF BUT-1-ENE

[75] Inventors: Bernard Boucheron, Bethune; Robert Charles; Emile Gosset, both of Lillebonne, all of France

[73] Assignee: Ethylene Plastique, Courbevoie, France

[22] Filed: Sept. 10, 1973

[21] Appl. No.: 395,857

[30] Foreign Application Priority Data

Sept. 14, 1972 France .............................. 72.32650

[52] U.S. Cl. ....... 260/88.2 R; 252/429 B; 260/93.7; 260/94.9 C
[51] Int. Cl.² ............................................ C08F 4/16
[58] Field of Search ............. 260/93.7, 94.9 C, 88.2

[56] References Cited
UNITED STATES PATENTS

| | | | |
|---|---|---|---|
| 3,147,241 | 9/1964 | Moberly | 260/94.9 C |
| 3,182,049 | 5/1965 | Moberly | 260/94.9 C |
| 3,514,433 | 5/1970 | Nicco | 260/94.9 C |

FOREIGN PATENTS OR APPLICATIONS 946,976  1/1964  United Kingdom

*Primary Examiner*—Edward J. Smith

[57] ABSTRACT

The invention provides a process for the preparation of but-1-ene homopolymers or copolymers of but-1-ene by the stereospecific polymerisation, using a Ziegler-Natta catalyst, of but-1-eme in solution. By carrying out the polymerisation in the presence of hydrogen and of hydrazine or a derivative thereof it is possible to prepare but-1-ene polymers of high stereospecificity.

2 Claims, No Drawings

PROCESS FOR THE PREPARATION OF POLYMERS OF BUT-1-ENE

The present invention relates to a process for improving the stereospecificity of the polymerisation of but-1-ene when using a catalyst of the Ziegler-Natta type.

α-Olefins such as but-1-ene can be polymerised by using stereospecific catalysts of the Ziegler-Natta type. It is known that certain additives can improve the performance (stereospecificity and/or reaction rate) of these catalysts. Amongst these additives, hydrazine and its derivatives, and especially 1,1-dimethyl-hydrazine (DMH), may be mentioned. It is also known that hydrogen can have an effect on the catalysts and on the polymerisation reaction. Thus hydrogen can be employed at a relatively high concentration as a transfer agent to control the molecular weight of the polymer or at a lower concentration to increase the stereospecificity of the reaction, the polymerisation of but-1-ene in particular.

The present invention provides a process for the preparation of but-1-ene homopolymers or copolymers by polymerising or copolymerising but-1-ene in solution in the presence of a stereospecific Ziegler-Natta catalyst, wherein the polymerisation reaction is carried out in the presence of hydrogen at a partial pressure of at least 0.01 bar and in the presence of 0.01 to 10 millimols of hydrazine or a derivative thereof per litre of reaction mixture.

The simultaneous use of hydrazine or a derivative thereof and hydrogen makes possible a greater increase in the stereospecificity of the polymerisation of but-1-ene by means of a Ziegler-Natta catalyst than can be achieved by using hydrogen alone or the hydrazine or hydrazine derivative alone. There was no reason to suppose that the combined action of the two additives would make it possible to obtain butene polymers of greater isotacticity, since the effect is not observed in the case of polypropylene.

The partial pressure of hydrogen preferably is between 0.1 and 1 bar, it being possible, however, for higher hydrogen pressures to be used when it is desired to produce polymers which are very isotactic but which have low molecular weights.

The amount of hydrazine or hydrazine derivative preferably is 0.05 to 2 millimols per litre of reaction mixture and the preferred hydrazine derivative is 1,1-dimethyl-hydrazine.

When it is desired to produce but-1-ene copolymers, the but-1-ene may be copolymerised with at least one other α-olefin, the α-olefin comonomer being present in the reaction mixture in an amount such that the copolymer obtained contains up to 15% by weight of units derived from the α-olefin.

Ethylene, propene and pent-1-ene are examples of α-olefins which can be used as comonomers.

The Ziegler-Natta catalysts which are used in accordance with the invention are well known. In general they comprise, as one component, an organometallic compound, and, as a second component, a transition metal halogen compound. The organometallic compound preferably is an organo-aluminium compound (such as a trialkylaluminium, for example triethylaluminium and dialkylaluminium halides, for example diethylaluminium chloride). The transition metal halogen compound is a compound of a metal of Group IVa, Va or VIa of the Periodic Table, such as titanium, vanadium or zirconium. The valency of the metal in the transition metal halogen compound preferably is less than the maximum valency of the metal. Catalytic compositions in which violet titanium trichloride is present, for example titanium trichloride co-crystallised with aluminium chloride, are preferably used.

The following Examples and Comparative Examples serve to illustrate the invention. In the Examples and Comparative Examples the isotacticity of the polymers produced is defined as the percentage of the total polymer which is insoluble in boiling diethyl ether.

COMPARATIVE EXAMPLE 1

520 g of but-1-ene of 99% purity and 10 mmols of diethylaluminium chloride are introduced into a 1 litre autoclave made of 18-8 stainless steel, equipped with a magnetic stirrer and tubes necessary for introducing the reagents. The reagents are kept out of contact with air and moisture by means of nitrogen. The autoclave is then immersed in a bath thermostatically controlled at $60 \pm 0.5°C$. and 0.12 mmol of titanium trichloride of the Stauffer AA type ($TiCl_3 . 1/3(AlCl_3)$) is introduced.

Polymerisation is allowed to take place for 3 hours, and 14 g of polybut-1-ene of isotacticity 84.5% are recovered by releasing the pressure on the solution.

Upon repeating this experiment the isotacticity of the polybut-1-enes obtained varied from one experiment to another in the range from 79 to 88%.

COMPARATIVE EXAMPLE 2

The experiment of Comparative Example 1 is repeated with a hydrogen partial pressure of 0.2 bar, the catalyst on this occasion being produced by reducing $TiCl_4$ by means of aluminium sesquichloride without heating and then heating the product several times. 25 g of polybutene of isotacticity 91.7% are obtained.

COMPARATIVE EXAMPLE 3

The experiment of Comparative Example 1 is repeated three times, but creating, in addition, a hydrogen partial pressure of, respectively, 0.5 bar, 1 bar and 2 bars in the 150 ml of the gas phase of the reactor. Between 30 and 40 g of polymer of isotacticity ranging from 91 to 93% are then recovered.

The experiments of Comparative Examples 2 and 3 show that the presence of hydrogen makes it possible to improve the isotacticity of the polybut-1-ene without however making it possible to exceed 93%.

COMPARATIVE EXAMPLE 4

The experiment of Comparative Example 1 is repeated, adding 0.3 mmol of DMH per litre of liquid but-1-ene, before introducing diethylaluminium chloride. Polymerisation is carried out for 5 hours at 60°C. and 12 g of polybut-1-ene are obtained, the isotacticity of which is 93.6%.

By repeating this experiment using, respectively, 0.05 mmol, 0.5 mmol and 2 mmols of DMH per litre of liquid but-1-ene, it was possible to produce polybutenes of isotacticity ranging from 92 to 94%.

It can be seen that the use of DMH alone leads to a polymer of which the maximum isotacticity is of the same order of magnitude as the maximum isotacticity obtained using hydrogen alone.

EXAMPLE 1

The experiment of Comparative Example 1 was repeated, but using DMH and hydrogen simultaneously. The following results were obtained:

| DMH | Partial pressure of hydrogen | Isotacticity of the polybutene |
|---|---|---|
| 0.6 mmol/l of butene | 1 bar | 96.3% |
| 0.3 mmol/l | 1 bar | 95.7% |
| 0.15 mmol/l | 1 bar | 95.7% |

COMPARATIVE EXAMPLE 5

1,600 g of but-1-ene and 30 mmols of diethylaluminium chloride are introduced into a 3 l autoclave equipped with a mechanical stirrer and tubes necessary for introducing the reagents and the monomer in the absence of air and moisture. The contents of the autoclave are brought to (60 ± 0.5°C.) by making hot oil flow through the heating jacket. 0.9 mmol of $TiCl_3$ Stauffer AA ($TiCl_3.1/3(AlCl_3)$) is the introduced and polymerisation is allowed to take place for 3 hours. The polymer is recovered in the absence of air. It is dissolved in anhydrous cyclohexane and the catalyst is deactivated by adding isopropanol. The solution is then washed with boiling water and, after evaporating the solvent, 120 g of polybut-1-ene of isotacticity 68.3% are obtained.

EXAMPLE 2

The experiment of Comparative Example 5 is repeated, adding 0.6 mmol of commercial anhydrous DMH, dried over a 3A molecular sieve, to the butene before introducing the diethylaluminium chloride, and creating a hydrogen partial pressure of 0.8 bar in the reactor. 117 g of polymer of isotacticity 97.7% are obtained.

EXAMPLE 3

Comparative Example 5 is repeated with the following differences:

0.6 mmol of anhydrous hydrazine (dried over a 3A molecular sieve) is introduced before the 30 mmols of diethylaluminium chloride.

0.6 mmol of titanium trichloride of the Stauffer AA type is used.

A hydrogen partial pressure of 1 bar is created.

At the end of the polymerisation, the contents of the autoclave are transferred into another apparatus where they are deactivated by means of isopropanol, washed with hot water and treated with an anti-oxidant. The polymer is then recovered by releasing the pressure acting on the solution. After drying, 191 g of polybut-1-ene of isotacticity 97.6% are obtained. (A sample of the same polymer, removed at the end of the polymerisation directly from the polymerisation autoclave, had an isotacticity of 98.2%).

EXAMPLE 4

The experiment of Example 3 is repeated with 1.2 mmols of hydrazine. 203 g of polybut-1-ene of isotacticity 98.5% are obtained. (A sample removed directly from the polymerisation autoclave had an isotacticity of 99%).

COMPARATIVE EXAMPLE 6

Example 3 is repeated but without hydrogen; 62 g of polybut-1-ene of isotacticity 93.9% are obtained.

We claim:

1. In a process for the preparation of but-1-ene polymers selected from the group consisting of but-1-ene homopolymers and copolymers of but-1-ene containing up to 15% by weight of another alpha-olefin by polymerizing or copolymerizing but-1-ene in solution in the presence of a stero-specific Ziegler-Natta catalyst comprising two components, the first being selected from dialkylaluminum halides and trialkylaluminum, and the second being selected from violet titanium trichloride and aluminum chloride co-crystallized therewith, the improvement wherein the polymerization reaction is carried out in the presence of both (i) hydrogen at a partial pressure of from 0.1 to 1 bar and (ii) from 0.05 to 2 millimols of an additive selected from hydrazine and 1,1-dimethyl-hydrazine per litre of reaction mixture.

2. A process according to claim 1, wherein but-1-ene is copolymerised with at least one other α-olefin.

* * * * *